United States Patent

Ranta et al.

[11] Patent Number: 6,108,328
[45] Date of Patent: Aug. 22, 2000

[54] METHOD AND ARRANGEMENT FOR SEPARATING SIGNALS OPERATING IN THE SAME CHANNEL

[75] Inventors: Pekka Ranta, Espoo; Harri Jokinen, Hiisi; Ari Hottinen; Zhichun Honkasalo, both of Vantaa, all of Finland

[73] Assignees: Nokia Mobile Phones Ltd.; Nokia Telecommunications Oy, both of Espoo, Finland

[21] Appl. No.: 08/836,023
[22] PCT Filed: Oct. 30, 1995
[86] PCT No.: PCT/FI95/00597
§ 371 Date: Jul. 16, 1997
§ 102(e) Date: Jul. 16, 1997
[87] PCT Pub. No.: WO96/13909
PCT Pub. Date: May 9, 1996

[30] Foreign Application Priority Data

Oct. 31, 1994 [FI] Finland ................................. 945108

[51] Int. Cl.[7] ............................................... H04J 3/00
[52] U.S. Cl. ..................... 370/345; 370/498; 370/522; 375/232; 455/63; 455/70
[58] Field of Search ..................... 370/310, 311, 370/335, 345, 347, 498, 342, 343, 522; 455/63, 70, 450, 452, 447, 522; 375/200, 232

[56] References Cited

U.S. PATENT DOCUMENTS

| | | | |
|---|---|---|---|
| 4,222,115 | 9/1980 | Cooper et al. | 375/1 |
| 5,048,015 | 9/1991 | Zilberfarb | 370/110.4 |
| 5,182,749 | 1/1993 | Kazecki et al. | 370/498 |
| 5,430,760 | 7/1995 | Dent | 375/200 |
| 5,740,536 | 4/1998 | Benveniste | 455/450 |
| 5,787,352 | 7/1998 | Benveniste | 455/452 |

FOREIGN PATENT DOCUMENTS

0453591 A1  10/1991  European Pat. Off. .

OTHER PUBLICATIONS

"Joint Estimation Algorithms for Cochannel Signal Demodulation" Giridhar et al. ICC 93, (1993).

*Primary Examiner*—Douglas W. Olms
*Assistant Examiner*—Shick Hom
*Attorney, Agent, or Firm*—Perman & Green, LLP

[57] ABSTRACT

The object of the invention is a method and an arrangement for separating signals operating in the same channel. In the solution according to the invention, the signals to be transmitted are conditioned so that the receiver at the other end of the transmission route is able to separate an effective signal from an interference signal. The invention can be applied in the TDMA systems used in data communication cellular networks.

18 Claims, 2 Drawing Sheets

METHOD AND ARRANGEMENT FOR SEPARATING SIGNALS OPERATING IN THE SAME CHANNEL

BACKGROUND OF THE INVENTION

1. Field of the Invention

The present invention relates to data communications and particularly to cellular networks in data communications using time division multiple access (TDMA) systems.

The object of the invention is a method and an arrangement for separating signals which operate in the same channel. The solution according to the invention can be applied in time division multiple access systems used in cellular networks of data communications.

2. Description of the Prior Art

In the TDMA (Time Division Multiple Access) systems used in cellular networks of data communications the interferences caused by cells using the same frequency limit the capacity of the system. Such interferences are called Co-Channel Interferences (CCI). A fairly typical interference case in TDMA cellular networks is the presence of a single strong interfering factor. Although in the following we mainly concentrate on a case where there is only one strong interferer present, the solution according to the invention can also be applied in the case of several interferers.

The capacity of the TDMA cellular network system has been enhanced by increasing the geographical re-use of the frequencies and by simultaneously decreasing the cell sizes and reducing the transmission power. This solution, which is generally used, is not satisfactory because its infrastructure becomes considerably inefficient and expensive.

A conventional approach to the cochannel interferences is to treat them as random white Gaussian noise in receivers. This approach is only satisfactory if the CCI interferences are close to the conventional noise level; however, this is generally not the case in cellular systems which are typically fairly interference-free. The CCI interferences are fairly deterministic in nature implying that we should be able to remove at least part of their negative influence.

Instead of attenuating the interference channel, the latest techniques show how to jointly estimate both the correct signal and the interfering signal. This technique is described, for instance, in the article by K. Giridhar et al: "Joint Estimation Algorithms for Cochannel Signal Demodulation", ICC 93, Conference Proceedings.

This is described briefly in the following with reference to FIG. 1. In FIG. 1, $d_1(k)$ and $d_2(k)$ are the symbols of the signal source of the first and, correspondingly, the second, i.e., the interfering channel. The pulse function g(t) has a raised-cosine pulse and its duration is 2T. After channels $h_1(t)$ and $h_2(t)$ the signals are combined and sampled in the T/2 sampling block. The separation of the signals is based either on the JMLSE (Joint Maximum Likelihood Sequence Estimation) or the JMAPSD (Joint Maximum A Posteriori Symbol Detection).

Problem to be solved:

Cochannel interferences often cause problems in spite of the above-described equalizer solutions according to a known technique and the parameters, i.e., impulse responses of the channel considerably correlate with each other. The situation is especially problematic with the above-described solutions when the power of the interference signal is almost as high as the power of the effective signal, or when their respective powers correlate with each other.

SUMMARY OF THE INVENTION

The present invention is based on the idea that both the correct signal and the interfering signal (one or several) are analyzed in the same way as in the publication mentioned above.

To accomplish this, the method according to the invention is characterized in what is described in claim 1. The features of the arrangement according to the invention are correspondingly disclosed in claim 7.

Additional information is thus added to the signals transmitted according to the invention, the information being different for each channel, whereby the receiver at the other end of the transmission route is able to separate an effective signal from an interfering signal or the effective signals from each other. The additional information can be a channel-specific coding in which different code polynomials are included in the signals. Though the method is primarily designed to separate an effective signal from an interfering signal, it can also be applied in receiving several effective signals in the same channel. Another possibility is to code the signals, using filters with different impulse responses. The codings or impulse responses can be time-invariant or time-variant in ways which deviate from each other. The time-variance can thus be a priori known or unknown by the receiver.

An alternative way to include additional information in the signals is to alter, in the signals, the power levels or amplitudes of the signals in a time-varying manner. This can be applied especially when the powers otherwise are close to one another or correlate with one another. In this case the memory of the data to be transferred is not increased but the signals have to be received on different power levels.

The invention is described in the following in detail with reference to the appended figures in which:

DETAILED DESCRIPTION OF THE PREFERRED EMBODIMENT

Figure 1:
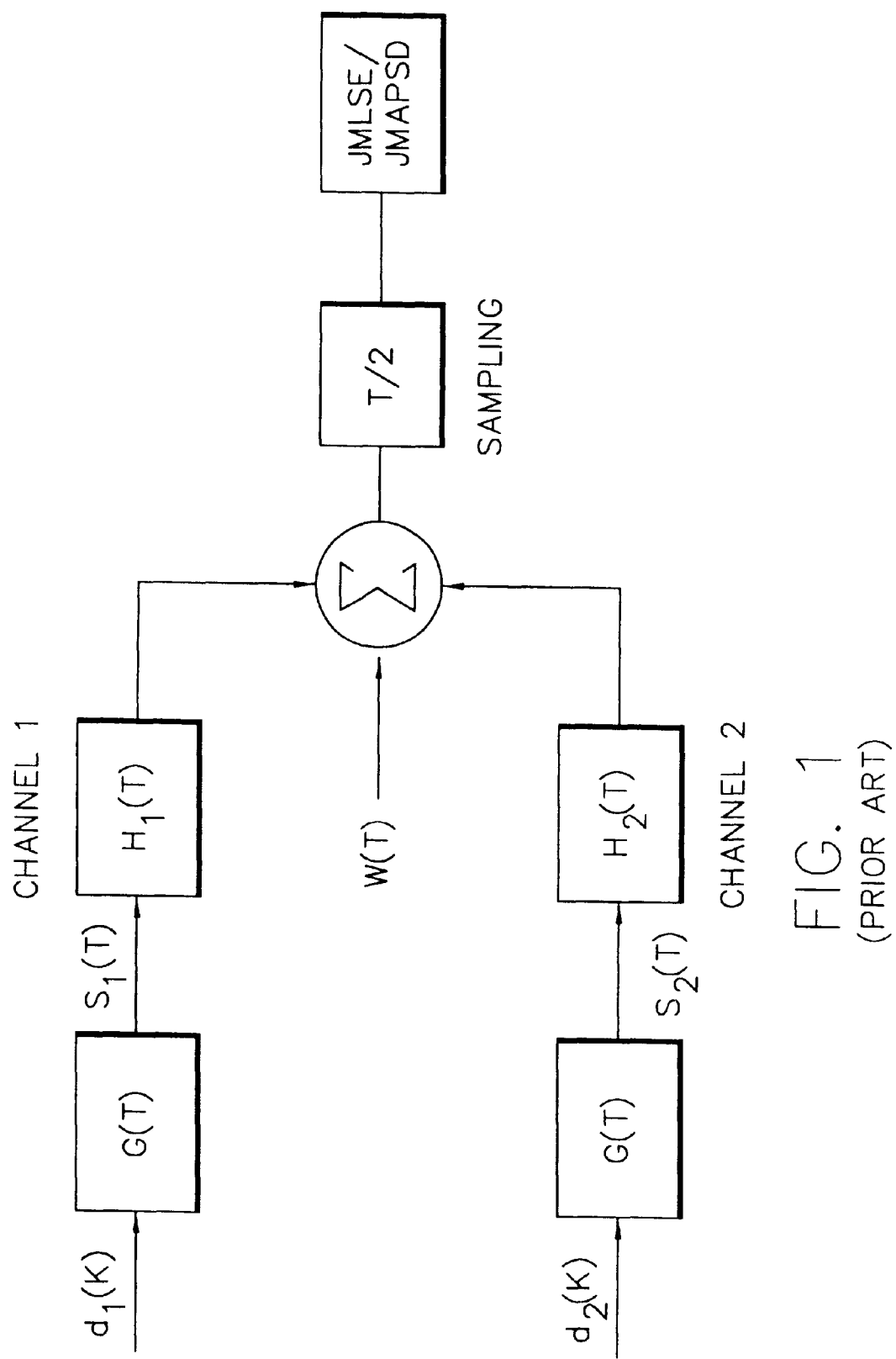
FIG. 1 presents the arrangement according to the known technique already described and the signal flow diagram of a feedback equalizer.
Figure 2:
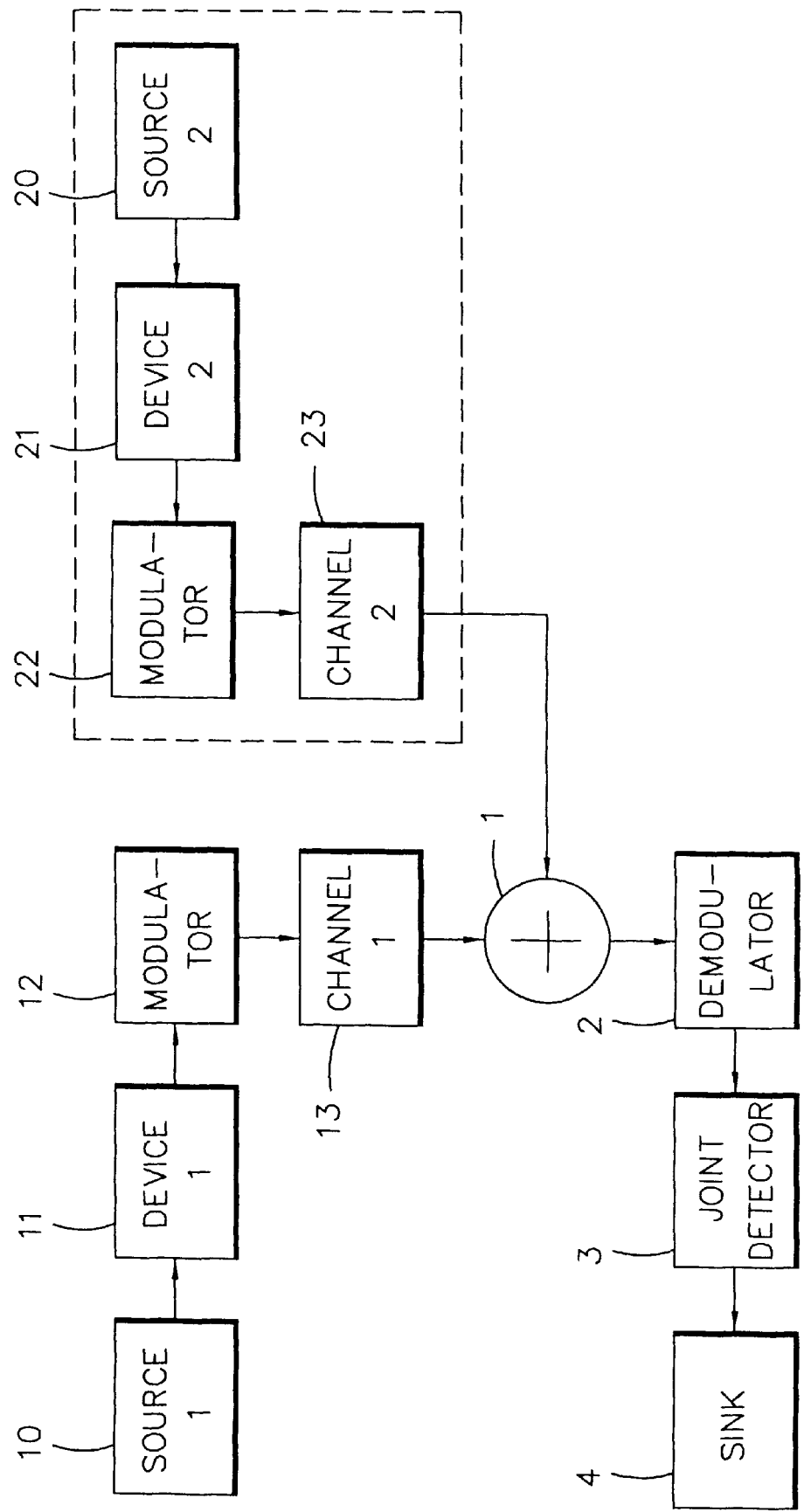
FIG. 2 presents the arrangement according to the invention.

FIG. 2 thus presents the arrangement according to the invention for separating signals operating in the same channel. The arrangement according to the invention comprises effective signal source 10, interference prevention device 11, effective signal modulator 12, and effective signal channel 13. Correspondingly, the interferer which comes to the same channel comprises interference signal source 20, interference prevention device 21, interference signal modulator 22, and interference signal channel 23. The receive part comprises summing point 1 of signals, demodulator 2, joint detector 3 and sink 4. The summing point mainly illustrates the antenna of the receiver in this schematic presentation.

In the arrangement according to the invention, both effective signal source 10 and interference signal source 20 of the interferer use the cellular network system. Signal sources 10, 20 are taken to modulators 12, 22 via interference prevention devices 11, 21. The signals coming from the modulators propagate to channels 13, 23, where they are summed in summing point 1. The signal summed in the receiver is brought via demodulator 2 to joint detector 3, where the effective signal is separated from the interference signal before sink 4.

Interference prevention devices 11, 21 can alternatively be situated after modulators 12, 22. In this case, the signal sources are taken to the interference prevention devices via the modulators.

In the arrangement according to the invention, the task of interference prevention devices 11, 21 is to shape the signal to be transmitted so that detector 3, at the other end of the transmission route, is able to separate an effective signal from an interference signal. The interference prevention devices can include in the signals certain time-invariant pieces of information which deviate from each other, such as different code polynomials, or the devices can comprise filters that are used to provide impulse responses which deviate from each other. In this case the correlation of the signals is decreased and the joint detector is able to separate an effective signal from an interference signal or a number of effective signals from each other. Alternatively, the impulse responses or codings contained in interference prevention devices 11, 21 can be time-variant in a different manner. In this case, the time-variance can be a priori known or unknown by joint detector 3 of the receiver.

The time-invariant coding can use channel-specific coding, for instance, or the Trellis code modulation. The codes must be chosen very carefully in order to ensure that the received signals can be separated from each other in the best possible way.

The arrangement according to the invention also takes into consideration the fact that receivers in a cellular network system have advance information about possible interference signal channels, and so the additional memory can be utilized very effectively. The advance information can be ensured by a proper design of the cellular network.

What is claimed is:

1. A method for separating effective signals and interference signals operating in the same channel in time division multiple access (TDMA) systems used in cellular networks for data communications, comprising the steps of:

including certain additional, diverging pieces of information in the effective signals and interference signals to be transmitted in the same channel in a TDMA system, and using a receiver at the point of receiving the transmitted signals with the included certain additional, diverging pieces of information, to separate an effective signal from an interference signal(s) or a number of effective signals from each other in the transmitted signals on the basis of said additional information.

2. The method according to claim 1, wherein the certain additional, diverging pieces of information included in the signals is channel-specific coding.

3. The method according to claim 1 wherein the signals comprise waveforms and the waveforms of the signals are coded using filters with different impulse responses.

4. The method according to claim 2 wherein the impulse responses are time-invariant.

5. The method according to claim 2, wherein the impulse responses are time-variant in ways which deviate from each other.

6. The method according to claim 2, wherein the signals comprise power levels or amplitudes and the power levels or amplitudes of the signals are altered time-variantly in ways which deviate from each other.

7. An arrangement for separating effective signals and interference signals operating in the same channel in time division multiple access systems used in data communication cellular networks having a transmit end and a receive end, the arrangement comprising:

at the transmit end:
   an effective signal source for producing effective signals, a modulator for modulating the effective signals produced by said effective signal source, and an effective signal transmission channel for communicating the modulated effective signals to a cellular network, an interference signal source for producing interference signals, a modulator for modulating the interference signals produced by said interference signal source, and an interference signal transmission channel for communicating the modulated interference signals to a cellular network, and at the receive end, a receiver comprising:
   a demodulator,
   a sink, and
   means for summing the effective signal and the interference signal in the receiver, and further comprising:
   interference prevention devices respectively situated after the effective signal and interference signal sources and before the effective signal and interference signal transmission channels, and a joint detector, which is situated after the summing means and separates the effective signal from the interference signal.

8. The arrangement according to claim 7, wherein the interference prevention devices are situated before the effective signals and interference signals modulators.

9. The arrangement according to claim 8, wherein the interference prevention devices are adapted to include in the signals certain codings and/or impulse responses which deviate from each other.

10. The arrangement according to claim 7, characterized in that the interference prevention devices are situated after the effective signals and interference signals modulators.

11. The arrangement according to claim 7 wherein the signals comprise waveforms and further comprising means for coding the waveforms of the signals comprising filters with different impulse responses.

12. The arrangement according to claim 11 wherein the impulse responses of said filters are time-invariant.

13. The arrangement according to claim 11, wherein the impulse responses of said filters are time-variant in ways which deviate from each other.

14. The arrangement according to claim 11, wherein the signals comprise power levels or amplitudes and said coding means comprises means for altering the power levels or amplitudes of the signals time-variantly in ways which deviate from each other.

15. A method for separating effective signals and interference signals operating in the same channel in time division multiple access TDMA systems used in cellular networks for data communications, comprising the steps of:

adding channel-specific coded information to the effective and interference signals to be transmitted in the same channel in a TDMA system, said signals comprising waveforms and the information being coded therein using filters with different impulse responses;

transmitting said effective and interference signals with said added information in said same channel; and receiving said transmitted signals with said added information and separating an effective signal from an interference signal, or a number of effective signals from each other, in the transmitted signals on the basis of said added information.

16. The method according to claim 15 wherein the impulse responses are time-invariant.

17. The method according to claim 16, wherein the impulse responses are time-variant in ways which deviate from each other.

18. The method according to claim 16, wherein the signals comprise power levels or amplitudes and the power levels or amplitudes of the signals are altered time-variantly in ways which deviate from each other.

* * * * *